US009936099B2

(12) United States Patent
Hasegawa et al.

(10) Patent No.: US 9,936,099 B2
(45) Date of Patent: Apr. 3, 2018

(54) PRINT CONTROL APPARATUS AND PRINT CONTROL METHOD FOR PRINT DATA GENERATION

(71) Applicant: SEIKO EPSON CORPORATION, Tokyo (JP)

(72) Inventors: Tomonaga Hasegawa, Nagano (JP); Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/198,094

(22) Filed: Jun. 30, 2016

(65) Prior Publication Data

US 2017/0034393 A1 Feb. 2, 2017

(30) Foreign Application Priority Data

Jul. 28, 2015 (JP) .................. 2015-148941

(51) Int. Cl.
*H04N 1/387* (2006.01)
*H04N 1/405* (2006.01)
*H04N 1/60* (2006.01)
*G06K 15/10* (2006.01)
*B41J 2/21* (2006.01)

(52) U.S. Cl.
CPC ............ *H04N 1/405* (2013.01); *B41J 2/2146* (2013.01); *G06K 15/102* (2013.01); *H04N 1/6008* (2013.01); *H04N 1/6025* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,777,759 A | 7/1998 | Kaburagi et al. | |
| 2004/0130754 A1* | 7/2004 | Usui | H04N 1/4058 358/3.13 |
| 2006/0056693 A1* | 3/2006 | Yamazaki | G06F 9/3814 382/173 |
| 2013/0286441 A1* | 10/2013 | Furukawa | H04N 1/4055 358/3.13 |
| 2016/0134780 A1* | 5/2016 | Genda | H04N 1/387 358/3.27 |

FOREIGN PATENT DOCUMENTS

JP 09-294208 A 11/1997
JP 2007-116433 A 5/2007

* cited by examiner

*Primary Examiner* — Barbara Reiner

(57) ABSTRACT

Provided is a print control apparatus that dispenses ink of a plurality of colors through corresponding nozzles according to print data, to print an image on a printing medium. The print control apparatus includes a print data generation unit that generates, according to the image, the print data defining on/off setting of dots in each of pixels with respect to the ink of each of the plurality of colors. The print data generation unit generates the print data for the ink of a specific color having highest brightness among the plurality of colors through first gray scale conversion using a dither mask, and generates the print data for the ink of the plurality of colors except for the color subjected to the first gray scale conversion, through second gray scale conversion using a line screen.

7 Claims, 7 Drawing Sheets

PRINT CONTROL APPARATUS AND PRINT CONTROL METHOD FOR PRINT DATA GENERATION

BACKGROUND

1. Technical Field

The present invention relates to a print control apparatus and a print control method.

2. Related Art

Ink jet printers are known that include a plurality of nozzles and dispense ink of a plurality of colors through respectively corresponding nozzles to thereby print an image on a printing medium. Such printing is performed on the basis of print data that defines an on/off setting of dots with respect to the ink of each of the plurality of colors and each pixel. The print data is, for example, binarized so as to define the on/off setting of the dots. Accordingly, a process called gray scale conversion or halftone processing is performed to generate the print data from the image to be printed.

In addition, for example JP-A-2007-116433 discloses an image processing apparatus in which a 5 color/4 color selection signal indicates whether to output a toner image composed of five colors, namely cyan, magenta, yellow, black, and light black (CMYKL) (first recording mode) or a toner image composed of four colors of CMYK (second recording mode). The image processing apparatus is configured to perform pseudo-halftone processing of a dot screen with respect to three colors of CMY in the first and second recording modes, perform pseudo-halftone processing of a line screen with respect to KL in the first recording mode, and perform pseudo-halftone processing of the dot screen with respect to K in the second recording mode.

In the ink jet printer, a dither mask having a characteristic of generating random noises that are difficult to recognize with human eyes is often employed for the gray scale conversion to generate the print data. Although the gray scale conversion that employs such a dither mask provides high picture quality when a content that require relatively high gradation level is printed, when the user requires sharpness as picture quality, the gray scale conversion often fails to satisfy such a requirement.

Now, the ink jet printer that dispenses ink, which is a liquid, has an intrinsic drawback in that the ink of different colors interfere with each other upon being dispensed onto the printing medium, thereby producing "blur of colors". When gray scale conversion based on another method is employed in order to attain a sharp picture, instead of the gray scale conversion that employs the dither mask, the blur tends to appear on the printing medium in regular placement. The blur can be construed as a type of image degradation, and such blur that regularly appears is readily recognized visually as a pattern, which leads to degraded evaluation from users in terms of picture quality.

SUMMARY

An advantage of some aspects of the present invention is to provide a print control apparatus and a print control method capable of suppressing image degradation originating from blur of ink, thereby improving print quality.

In an aspect, the present invention provides a print control apparatus that dispenses ink of a plurality of colors through respectively corresponding nozzles according to print data to thereby print an image on a printing medium. The print control apparatus includes a print data generation unit that generates, according to the image, the print data defining on/off setting of dots in each of pixels with respect to the ink of each of the plurality of colors. The print data generation unit generates the print data for the ink of a specific color having highest brightness among the plurality of colors through first gray scale conversion using a dither mask, and generates the print data for the ink of the plurality of colors except for the color subjected to the first gray scale conversion, through second gray scale conversion using a line screen.

With the print control apparatus configured as above, the print data is generated through the second gray scale conversion using the line screen having the line-shaped period characteristic, with respect to the ink of some colors other than the ink of the specific color having the highest brightness. Therefore, a sharp picture can be attained as printing result. In addition, with respect to the ink of the specific color, the print data is generated through the first gray scale conversion using the dither mask having the noise characteristic. Such arrangements suppress appearance of regular blur originating from interference between the ink of the specific color and the ink of other colors, thereby providing a high-quality picture in which the blur is barely visible to the user.

In the foregoing print control apparatus, the print data generation unit may designate yellow as the specific color, and include black in the colors not subjected to the first gray scale conversion.

The mentioned arrangement prevents the blur originating from the interference between the yellow ink and the black ink, which are largely different from each other in brightness, from being emphasized (visually recognized regularly).

In the foregoing print control apparatus, the print data generation unit may generate the print data for the ink of a light shade through the first gray scale conversion, in addition to the ink of the specific color.

The mentioned arrangement prevents the blur originating from the interference between colors having a relatively large difference in brightness from each other, from being emphasized (visually recognized regularly).

The foregoing print control apparatus may be configured to perform printing by selecting one of a first printing mode in which a first printing medium is employed as the printing medium, and a second printing mode in which a second printing medium, more susceptible to ink blur than the first printing medium, is employed as the printing medium, and the print data generation unit may generate, when the second printing mode is selected, the print data for the ink of the specific color through the first gray scale conversion while generating the print data for the ink of the colors not subjected to the first gray scale conversion through the second gray scale conversion, and generate, when the first printing mode is selected, the print data for the ink of all of the plurality of colors through the first gray scale conversion.

The mentioned arrangement effectively prevents, when the second printing mode which is more likely to incur the blur is selected, image degradation due to the blur originating from the interference between the ink of the specific color and the ink of other colors, thereby providing a picture having a sharp appearance as a whole.

The technical idea of the present invention may be realized in a different form other than the print control apparatus which is a physical object. For example, the present invention may be realized in various categories such as a print control method including the process performed by the print control apparatus, a computer program that causes a computer to execute the method, or a computer-readable storage medium having the program recorded thereon.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, an embodiment of the present invention will be described with reference to the drawings. The drawings merely illustrate examples for explaining the embodiment, and may not always be consistent with each other.

1. General Description of Apparatus

Figure 1:
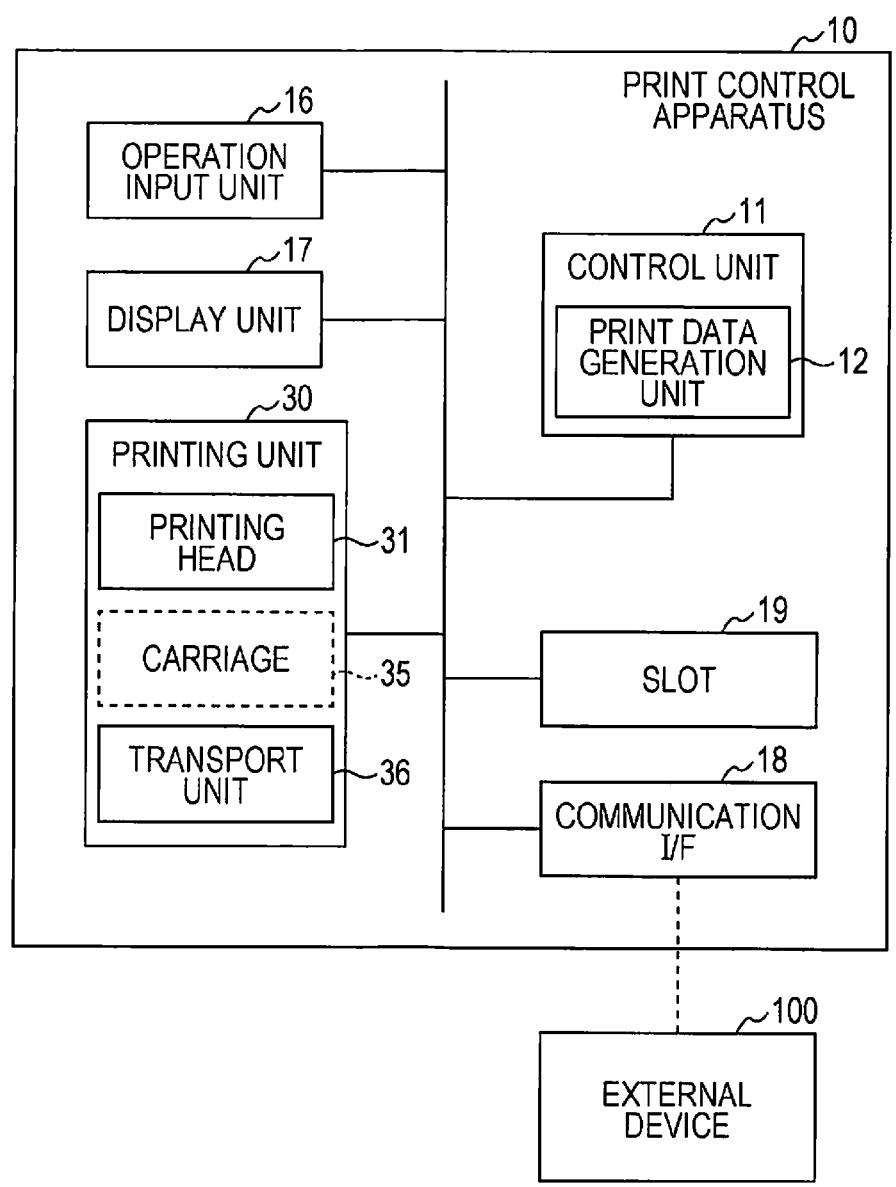
FIG. 1 is a block diagram showing a configuration of an apparatus according to an embodiment.

FIG. 1 is a block diagram showing a functional configuration of a print control apparatus 10 according to the embodiment. The print control apparatus 10 may be assumed, for example, to be a printer or a multifunction peripheral having a printing function. The print control apparatus 10 may also be called a printing apparatus, an image processing apparatus, or the like. When the print control apparatus 10 includes a printing unit 30 that actually performs a printing operation on a printing medium and a part of the illustrated configuration (for example, control unit 11 to be subsequently described) for controlling the behavior of the printing unit 30, such part of the configuration may be called as print control apparatus. The functional units of the print control apparatus 10 shown in FIG. 1 may be placed at separate locations so as to communicate with each other, thus constituting a system, instead of being placed at a single location or enclosed in a casing. For example, the print control apparatus 10 may include an apparatus (personal computer or the like) having a program (printer driver or the like) for controlling the behavior of the printer that performs printing on the printing medium, and configured to control the printer.

In the example shown in FIG. 1, the print control apparatus 10 includes a control unit 11, an operation input unit 16, a display unit 17, a communication interface (I/F) 18, a slot 19, and the printing unit 30. The control unit 11 includes, for example, an IC including a CPU, a ROM, and a RAM, and other types of storage media. In the control unit 11, the CPU executes computing operations according to a program stored in the ROM utilizing the RAM as work area, thereby realizing various processes, including the print control process to be subsequently described.

The operation input unit 16 includes buttons and keys for receiving instructions of the user. The display unit 17 serves to display various information regarding the print control apparatus 10, and includes a liquid crystal display (LCD), for example. A part of the operation input unit 16 may be realized as a touch panel displayed in the display unit 17.

The printing unit 30 is a mechanism for printing an image on the printing medium. When the printing unit 30 is configured to perform ink jet printing, the printing unit 30 includes a printing head 31 (see FIG. 3), a transport unit 36 that transports the printing medium along a predetermined transport direction, and so forth.

The printing head 31 receives supply of ink from a non-illustrated ink cartridge. When the printing unit 30 is configured to perform color printing, the printing head 31 receives the supply of ink of a plurality of colors (for example, cyan (C), magenta (M), yellow (Y), and black (K)) from each of the ink cartridges of the respective colors. The printing head 31 in configured to dispense (eject) the ink (ink droplets) through a plurality of nozzles 34 (see FIG. 3). When the dispensed ink lands on the printing medium, dots are formed on the printing medium and thus the printing is performed. While the term "dot" basically refers to the ink droplet that has landed on the printing medium, the expression "dot" may occasionally be used in the description of processes performed before the ink droplet lands on the printing medium. The specific types or number of the liquid utilized by the printing unit 30 are not limited to those cited above, but may include ink or liquid of light cyan, light magenta, orange, green, gray, light gray, white, metallic, and so forth.

The transport unit 36 includes, though not shown, rollers for supporting and transporting the printing medium, and a motor that drives the rollers. The rotation of the motor is controlled by the control unit 11. The printing medium may typically be a paper sheet. In this embodiment, however, any other material may be included in the concept of the printing medium, provided that the material allows a liquid to be recorded thereon and can be transported by the transport unit 36.

The communication I/F 18 collectively refers to interfaces that connect the print control apparatus 10 to an external device 100 via wired or wireless communication. The external device 100 may be any device that serves as input source of image data to the print control apparatus 10, the examples of which include a smart phone, a tablet terminal, a digital still camera, and a personal computer (PC). The print control apparatus 10 can be connected to the external device 100 through the communication I/F 18, via various methods and communication standards, such as a USB cable, a wired network, a wireless LAN, and e-mail communication.

The slot 19 is a port in which an external storage medium such as a memory card is to be inserted. Accordingly, the print control apparatus 10 can also receive image data stored in the external storage medium such as the memory card, when such storage medium is inserted in the slot 19.

Figure 2:
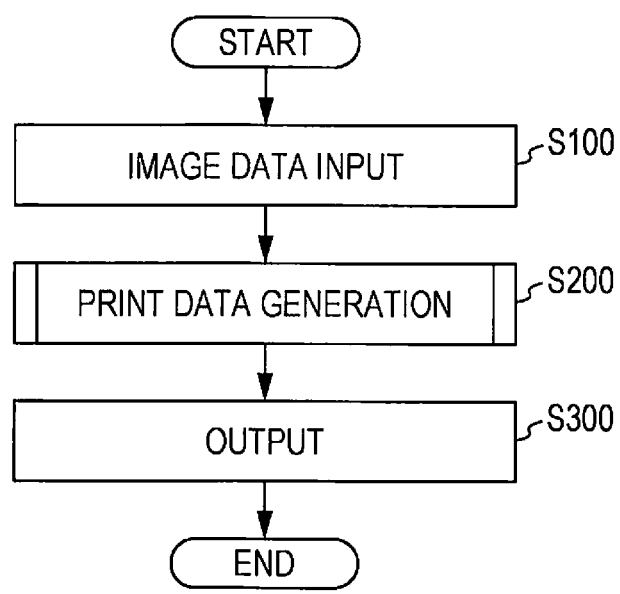
FIG. 2 is a flowchart showing a print control process.

FIG. 2 is a flowchart showing a print control process performed by the control unit 11. The control unit 11 performs, upon receipt of image data representing an image to be printed (step S100), image processing for generating print data from the image data (step S200). The image data inputted at step S100 is a file generated by various types of applications, for example bit map data expressed in gradations (for example, 256 gradations from 0 to 255) of red, green, and blue (RGB) with respect to each pixel. The control unit 11 appropriately performs the image processing such as resolution conversion, color (color system) conversion, and halftone processing, with respect to the image data, thereby generating the print data expressing the image to be printed in dot patterns of a plurality of pixels.

The dot pattern refers to an alignment of dots including dot-on points (dot is formed, i.e., ink is dispensed) and dot-off points (dot is not formed, i.e., ink is not dispensed), which can also be construed as defining the on/off of dots with respect to each pixel. When the printing head 31 dispenses CMYK inks for example, the print data includes data that defines the dot pattern of each of the CMYK colors. Further details of step S200 will be subsequently described.

The control unit 11 determines the nozzles 34 to which the pixels are allocated with respect to each of the pixels constituting the print data, and outputs (transfers) the print data to the printing head 31 after rearranging the pixels to a predetermined alignment to be transferred to the printing head 31, according to the determination of the nozzles (step S300). Through such allocation of the pixels to the nozzles 34, it is determined through which of the nozzles 34 of the printing head 31 the dots constituting the print data are to be formed.

The printing head 31 drives the nozzle 34 according to the print data transferred thereto. For example, the control unit 11 may transmit a drive signal (a kind of pulse) for driving each of the nozzles 34, to the printing head 31. In the printing head 31, in short, the application of the drive signal to a driving element provided for each of the nozzles 34 is switched, according to the on/off information of the dots with respect to each pixel expressed by the print data. Accordingly, each of the nozzles 34 either dispenses or detains the ink, according to the information of the pixel allocated to each nozzle 34. Consequently, the image to be printed is printed on the printing medium.

Figure 3:
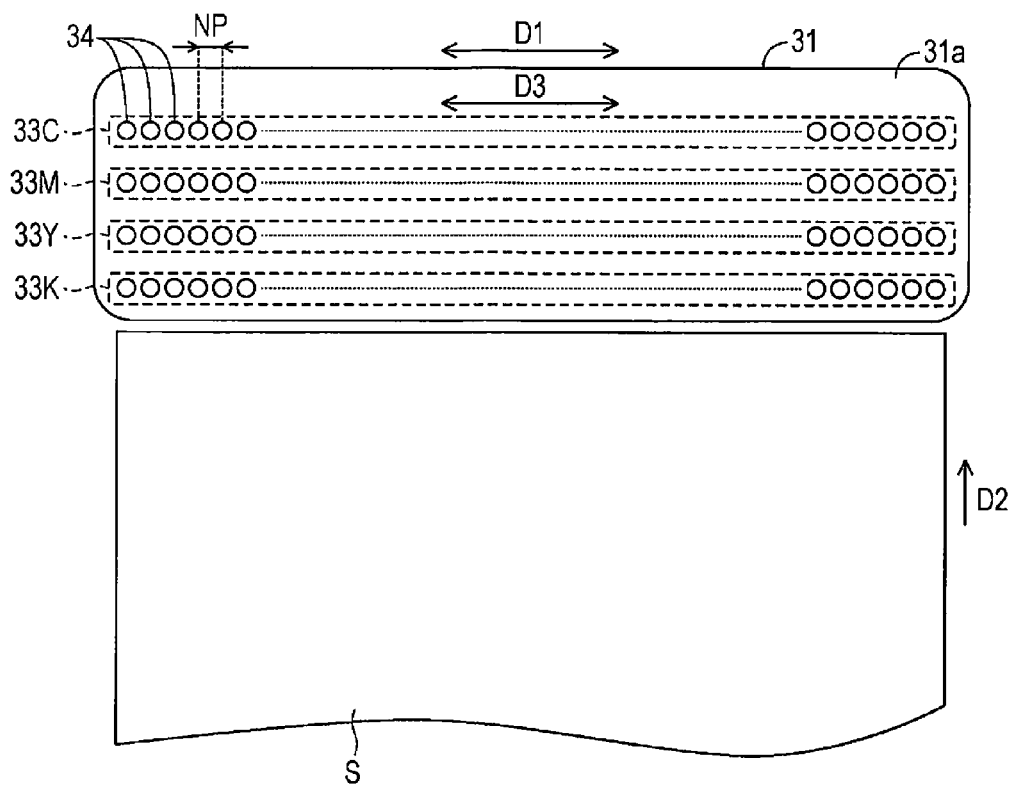
FIG. 3 is a schematic drawing showing a configuration of a printing head.

FIG. 3 is a schematic drawing showing a configuration of the printing head constituted as a line head. FIG. 3 illustrates the alignment of the nozzles 34 on an ink dispensing surface 31a of the printing head 31, viewed from above the printing head 31. In FIG. 3, the nozzles 34 are indicated by circles. The ink dispensing surface 31a corresponds to the opening of the nozzles 34, and is opposed to the printing medium S transported by the transport unit 36 along the transport direction. In FIG. 3, a direction D1 denotes a longitudinal direction of the line head (printing head 31), a direction D2 denotes the transport direction, and a direction D3 denotes a direction in which the nozzles form a row. Basically, the longitudinal direction D1 and the transport direction D2 are orthogonal to each other.

In the example shown in FIG. 3, the printing head 31 includes a nozzle row 33C for dispensing the C ink, a nozzle row 33M for dispensing the M ink, a nozzle row 33Y for dispensing the Y ink, and a nozzle row 33K for dispensing the K ink. In each of the nozzle rows 33C, 33M, 33Y, and 33K, a plurality of nozzles 34 for dispensing the ink of the corresponding color are aligned in the nozzle row direction D3 at predetermined intervals (constant nozzle pitch NP). The nozzle rows 33C, 33M, 33Y, and 33K are provided over a range that covers a width of the printing medium S (taken in the longitudinal direction D1) transported in the transport direction D2.

The nozzle row direction D3 intersects the transport direction D2. The nozzle row direction D3 may be orthogonal to the transport direction D2, or oblique thereto instead of orthogonal (90 degrees), depending on the design of the printing unit 30. In the example of FIG. 3, the nozzle row direction D3 is orthogonal to the transport direction D2, in other words the nozzle row direction D3 and the longitudinal direction D1 are parallel to each other. Accordingly, the nozzle pitch NP shown in FIG. 3 corresponds to the interval between the nozzles 34 in the longitudinal direction D1. In the case where the nozzle row direction D3 is oblique to the transport direction D2 instead of orthogonal, the interval between the nozzles 34 in the longitudinal direction D1 becomes narrower than the nozzle pitch NP. Here, the terms that should normally be strictly construed, such as orthogonal, parallel, and constant, are not intended to be construed in their strict sense, but encompass permissible allowances in practical use of the product and errors in dimensions that may by incurred during the production process.

The ink of a given color may be dispensed, for example, from a plurality of nozzle rows deviated from each other in the nozzle row direction D3, instead of from a single nozzle row.

The control unit 11 controls the ink dispensation from the nozzles 34 of the printing head 31 based on the print data, and the transport of the printing medium S by the transport unit 36, at the same time. The mentioned configuration enables the print control apparatus 10 to realize the printing on the printing medium S, by dispensing the ink of the plurality of colors through the respectively corresponding nozzles 34 according to the print data.

2. Print Data Generation Including Halftone Processing

Figure 4:
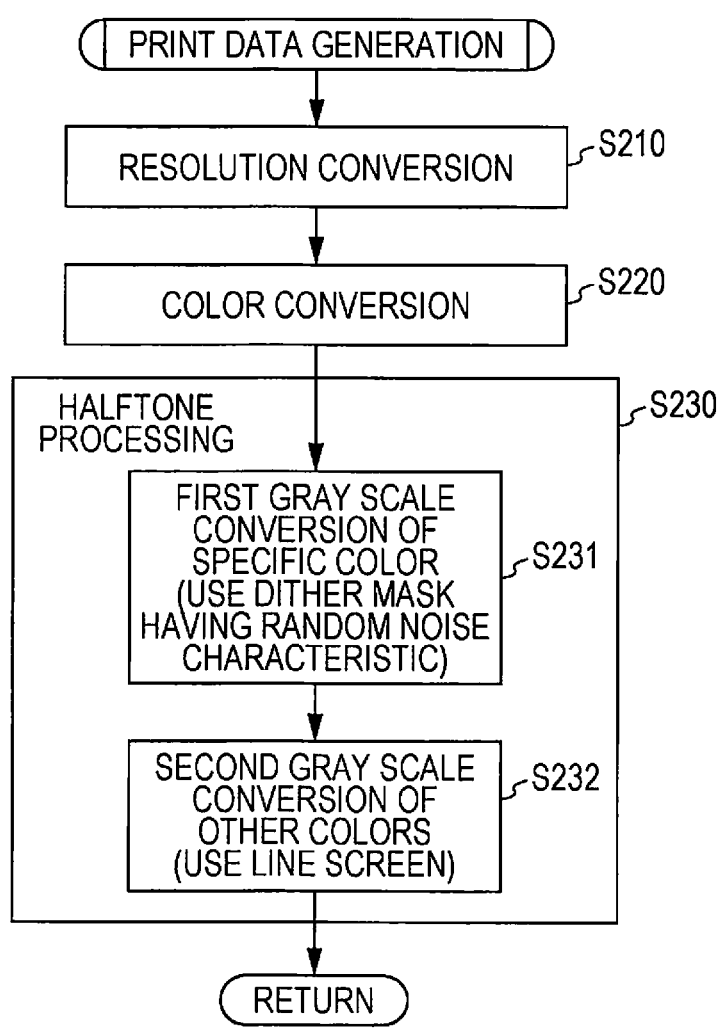
FIG. 4 is a flowchart showing a print data generation process.

FIG. 4 is a flowchart showing the details of step S200 in FIG. 2 (print data generation). At step S210, the control unit 11 performs the resolution conversion of the image data inputted at step S100. To be more detailed, the control unit 11 converts (interpolates or decimates) the pixels so as to match the horizontal resolution and the vertical resolution of the image data with the horizontal printing resolution and the vertical printing resolution adopted by the printing unit 30, respectively. Referring to FIG. 3, the horizontal printing resolution corresponds to the printing resolution in the longitudinal direction D1, and the vertical printing resolution corresponds to the printing resolution in the transport direction D2. The user can change, by operating the operation input unit 16 before starting the print control process (FIG. 2), the default setting of the horizontal printing resolution and the vertical printing resolution adopted by the printing unit 30, through a non-illustrated user interface (UI) screen displayed on the display unit 17. When such a change is made, the control unit 11 adopts the horizontal printing resolution and the vertical printing resolution according to the setting after the change. When no change is made, the control unit 11 may adopt the default setting.

At step S220, the control unit 11 converts, by color conversion, the image data which has undergone step S210 to the image data in which the density of the CMYK inks is expressed in gradations (for example, 256 gradations from 0 to 255) with respect to each pixel. The color conversion can be executed, for example, by referring to a lookup table (color conversion LUT) defining the conversion relationship between RGB and CMYK and stored in advance in a predetermined memory.

At step S230, the control unit 11 performs halftone processing on the image data which has undergone step S220, thereby generating the print data expressing the dot pattern of each of CMYK colors. The control unit 11 may be construed as acting as the print data generation unit 12 (see FIG. 1), in generating the print data defining the on/off setting of the dots of each of the plurality of colors (CMYK colors) with respect to each pixel, on the basis of the image data through steps S210 to S230.

At step S230, the control unit 11 (print data generation unit 12) generates the print data at least for the ink of a specific color having the highest brightness among the plurality of colors used by the printing unit 30, through first gray scale conversion using a dither mask (step S231), and generates the print data for the ink of the colors included in the plurality of colors not subjected to the first gray scale conversion, through second gray scale conversion using a line screen (step S232). Here, the second gray scale conversion (step S232) may be performed before the first gray scale conversion (step S231), or the first and second gray scale conversions may be performed in parallel, depending on the capacity of the control unit 11.

The specific color having the highest brightness among the plurality of colors used by the printing unit 30 corresponds to Y, when the printing unit 30 employs the CMYK inks. The specific color may differ depending on the combination of the colors used by the printing unit 30. Hereunder, it will be assumed that the specific color is Y as an example, and that the colors not subjected to the first gray scale conversion (step S231) are CMK.

The dither mask used by the control unit 11 in the first gray scale conversion (step S231) has a characteristic that generates random noises that are difficult to be recognized by a human eye, for example so-called blue noise characteristic. In the dither mask, thresholds (for example, 0 to 255) applied to each of the pixels constituting the image to be processed are randomly positioned. The control unit 11 performs the halftone processing on the density of the Y ink, which is the specific color, by dither method using such a dither mask, to the image data expressing the density of the Y ink in gradations with respect to each pixel, thereby generating the print data for the Y ink which is the specific color.

The line screen used by the control unit 11 in the second gray scale conversion (step S232) is a kind of halftone screen, which generates a dot pattern with a line defined by a certain number of lines per inch (lpi) and a screen angle. The line screen can express the light and shade of the image by making the line (aggregated dots) thicker or finer according to the color density of the image to be processed. The line screen is also a matrix having thresholds applied to the pixels constituting the image to be processed, like the dither mask used at step S231, and the thresholds are each located on the basis of the number of lines per inch (lpi) and the screen angle. Accordingly, the lines composed of the dots can be periodically generated so as to express an image, by employing the line screen. The control unit 11 performs the halftone processing using the mentioned line screen, to convert the image data into the data expressing the density of the CMK inks, not subjected to the first gray scale conversion (step S231), in gradations with respect to each pixel, thereby generating the print data for the CMK inks.

The number of lines per inch in the line screen may be set, for example, to 168 lpi or 192 lpi. The screen angle in the line screen for each color may be set, for example, to 68° for C, −68° for M, 34° for K, and −34° for Y, with respect to a reference angle of 0° set on a certain direction (for example a vertical direction). Since Y is not subjected to the second gray scale conversion, the angle of Y is merely a reference.

Figure 5A:
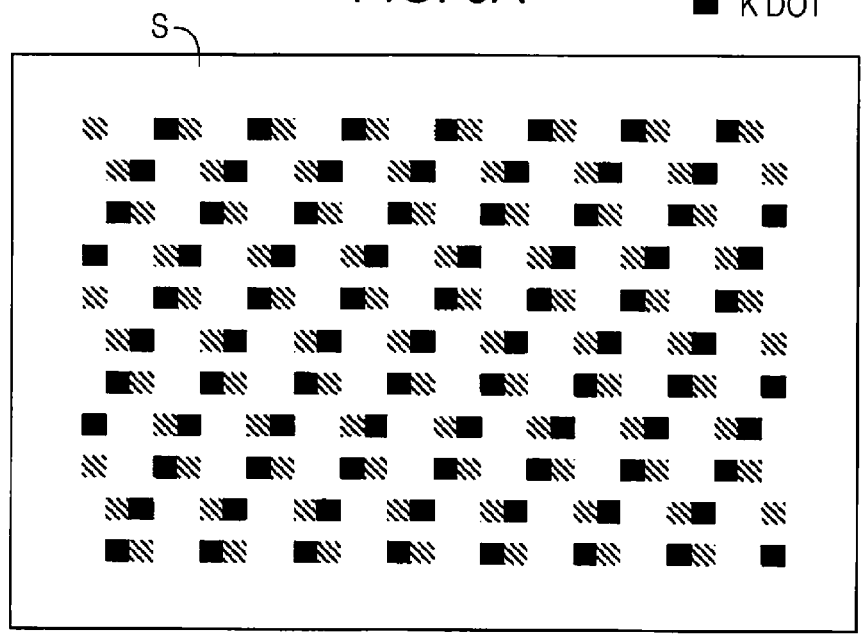
FIGS. 5A and 5B are schematic drawings showing examples comparative to a printing result according to the embodiment.
Figure 5B:
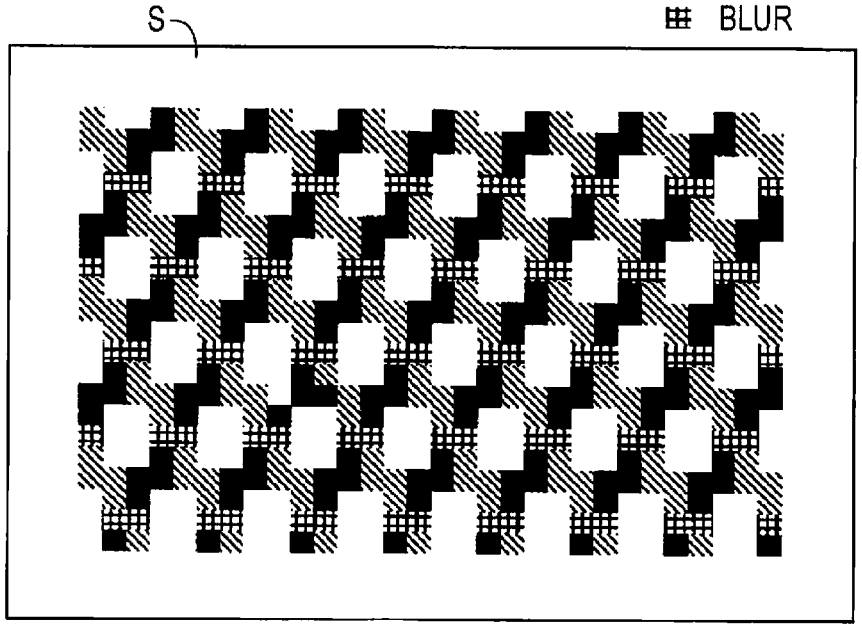
Figure 6:
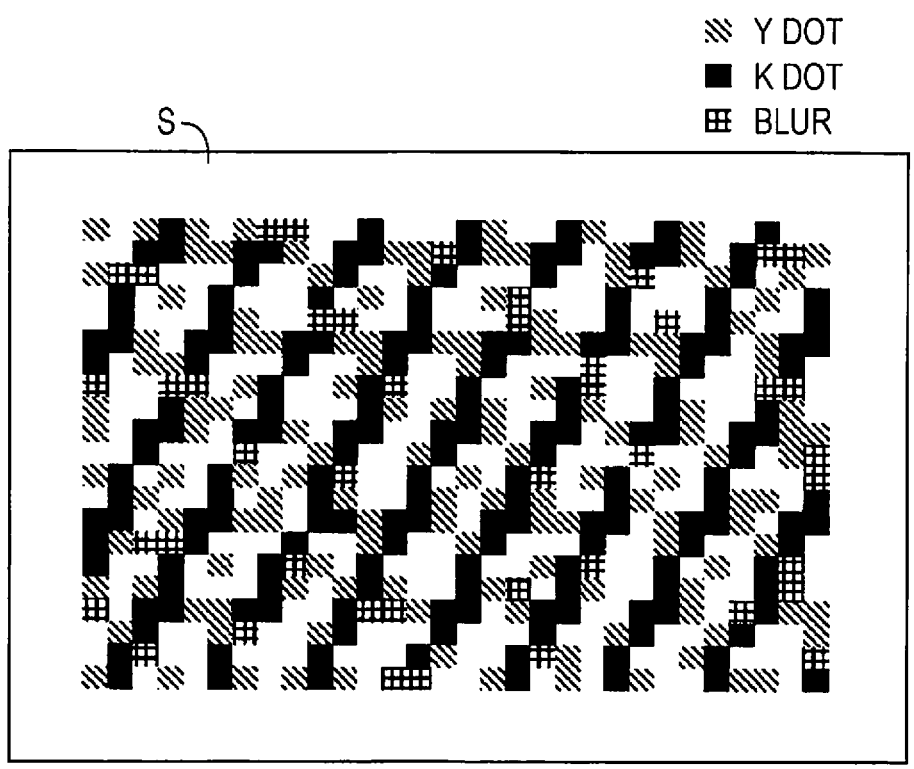
FIG. 6 is a schematic drawing showing a printing result according to the embodiment.

Referring now to FIGS. 5A, 5B and FIG. 6, the advantageous effects of this embodiment will be described hereunder. FIG. 6 illustrates an example of a printing result according to this embodiment, and FIGS. 5A and 5B illustrate examples comparative to the printing result according to this embodiment. More specifically, FIG. 5A and FIG. 5B illustrate a part of the printing result obtained on the printing medium S with the printing unit 30, from the print data generated by the control unit 11 through the second gray scale conversion using the line screen, with respect to the ink of all the colors (CMYK inks) used by the printing unit 30. In contrast, FIG. 6 illustrates a part of the printing result obtained on the printing medium S with the printing unit 30, from the print data generated by the control unit 11 in accordance with this embodiment, through the first gray scale conversion and the second gray scale conversion selectively, with respect to the ink of the specific color (Y ink) and the ink of other colors (CMK inks) (step S230 in FIG. 4).

FIGS. 5A, 5B and FIG. 6 illustrate the dots of the Y ink (Y dots) and the dots of the K ink (K dots) out of the dots formed on the printing medium S, and the dots of the C ink and the M ink that are actually formed are omitted. In FIGS. 5A, 5B and FIG. 6, the Y dots are illustrated in hatched rectangles, and the K dots are illustrated in solid rectangles. Although the dots actually formed on the printing medium S are normally circular or elliptical, the rectangles are adopted for the sake of convenience in FIGS. 5A, 5B and FIG. 6. The difference between FIGS. 5A and 5B lies in color density of the overall image to be printed. FIG. 5B illustrates the printing result of an image having higher density than the image the printing result of which is shown in FIG. 5A. FIG. 6 illustrates the printing result of the image having higher density as in FIG. 5B.

The printing results shown in FIGS. 5A and 5B are represented by lines composed of Y dots (from upper left to lower right in the drawing) and lines composed of K dots (from upper right to lower left in the drawing) generated through the second gray scale conversion. The lines composed of Y dots and the lines composed of K dots intersect with each other. In addition, as is apparent through comparison between FIG. 5A and FIG. 5B, the lines in FIG. 5B are composed of a larger number of dots because FIG. 5B represents the printing result of the image having higher density, and a larger region on the printing medium S is covered with the ink. Likewise, in the printing result shown in FIG. 6 also, a larger region on the printing medium S is covered with the ink, than in FIG. 5A.

Rectangles with a checker pattern in FIG. 5B represent positions where blur of the Y ink and the K ink has appeared. Such blur is produced when the Y ink dispensed from the nozzle 34 in the nozzle row 33Y and the K ink dispensed from the nozzle 34 in the nozzle row 33K overlap or are positioned close to each other on the printing medium S, and interfere with each other before drying and being fixed on the printing medium S as dots. The blur is prone to appear at the intersection between the lines composed of Y dots and the lines composed of K dots, as shown in FIG. 5B. Here, FIG. 5A exemplifies the case where the blur has not been produced because a fewer number of dots are formed on the printing medium S in the first place (blur of a level that affects the picture quality has not been produced).

As a matter of course, such blur is produced from other color combinations than the combination of the Y ink and the K ink. Y and K constitute a combination that makes the largest difference in brightness, among the plurality of colors CMYK used by the printing unit 30. Accordingly, the blur originating from the combination of the Y ink and the K ink in particular, among various color combinations, prominently affects the quality of the printing result. It is for such reason that the blur originating from the combination of the Y ink and the K ink is herein focused on.

As already stated, the second gray scale conversion is performed for periodically generating the lines composed of the dots. Therefore, the intersections between the lines composed of Y dots and the lines composed of K dots, which are different in screen angle from each other, are formed periodically, in other words regularly. The blur appears at each of the intersections regularly formed on the printing medium S, as shown in FIG. 5B. The pattern of the regular blur is readily recognized visually by the user on the printing medium S, which leads to degraded evaluation from users in terms of picture quality. Thus, in the case where the print data for the ink of all the colors (CMYK inks) used by the printing unit 30 is generated through the second gray scale conversion using the line screen, the regular blurs appear in the printing result so as to degrade the image quality, when an image having higher density than a certain level is printed.

In FIG. 6 also, the rectangles with the checker pattern indicate the positions where the blur of the Y ink and the K ink has appeared, as in FIG. 5B. However, in the printing result shown in FIG. 6, the Y dots are randomly positioned through the first gray scale conversion. Therefore, the blur of the Y ink and the K ink randomly appears as shown in FIG. 6. The blur located randomly instead of regularly is less likely to be visually recognized by the user on the printing medium S, than the regularly located blur. Thus, in this embodiment the blur originating from the combination of the colors having the largest difference in brightness (blur of Y ink and K ink when CMYK inks is used), which constitutes a major factor of image degradation, is irregularly positioned, to thereby provide a printing result in which the blur is barely visible, in other words which can attain high evaluation from the user. Here, the pseudo-halftone processing of the dot screen disclosed in JP-A-2007-116433 is arranged so as to regularly align meshes of aggregated dots, and not to randomly position the dots of the specific color, as done through the first gray scale conversion.

In this embodiment, further, basically the print data is generated through the second gray scale conversion using the line screen, with respect to the ink of the colors other than the specific color (CMK inks). Therefore, a sharper picture can be obtained compared to the case of generating the picture data through the halftone processing using the dither mask having the random noise characteristic, with respect to the CMK inks. From such a viewpoint, this embodiment is particularly advantageous for color printing of a material from which a sharp printing result is required, for example a business document including sentences and graphs. Consequently, this embodiment effectively prevents image degradation due to the blur originating from the interference between different colors, thereby providing a picture having a sharp appearance.

3. Variations

The present invention is not limited to the foregoing embodiment, but may be modified in various manners without departing from the spirit of the present invention. For example, the following variations may be adopted. Any combinations of the configurations of the embodiment and the variations are also included in the scope of the present invention. In the following description of the variations, the same aspects as those of the foregoing embodiment will not be repeated.

Variation 1

At step S231, the control unit 11 generates the print data for at least the ink of the specific color having the highest brightness among the plurality of colors used by the printing unit 30, through the first gray scale conversion using the dither mask having the noise characteristic. Accordingly, the present invention does not exclude generation of the print data for the C ink and M ink, in addition to the Y ink selected as specific color, through the first gray scale conversion when the printing unit 30 uses the CMYK inks. However, in this case also, the print data for the K ink is generated through the second gray scale conversion. For example, the control unit 11 may generate the print data for the CM inks through the second gray scale conversion as stated above, when a printing result having high-level sharpness is required because of the feature of the image to be printed or by the instruction of the user, but generate the print data for the CM inks through the first gray scale conversion when the regular blur of colors has to be effectively suppressed.

Variation 2

The first gray scale conversion is primarily applied to a relatively light (pale) color. Accordingly, when the printing unit 30 also uses light shade inks such as light cyan and light magenta for printing, the control unit 11 may generate the print data for such light shade ink through the first gray scale conversion, in addition to the ink of the specific color. The mentioned arrangement effectively prevents image degradation due to blur originating from the interference between ink of a relatively deep color and ink of a relatively light color.

Variation 3

The user can specify the printing condition as desired through the non-illustrated UI screen displayed on the display unit 17, by operating the operation input unit 16 before starting the print control process (FIG. 2). The printing conditions that can be set include the type of the printing medium. In this variation, a mode in which a first printing medium is used will be referred to as first printing mode, and a mode in which a second printing medium, which is more susceptible to ink blur than the first printing medium, will be referred to as second printing mode. For example, the first printing medium may be glossy paper, and the second printing medium may be plain paper. Alternatively, the printing media compatible with the printing unit 30 may be classified into a group of the printing media relatively resistant to ink blur (first group) and a group of the printing media relatively susceptible to ink blur (second group), and the first printing medium may be selected from the first group and the second printing medium may be selected from the second group.

Figure 7:
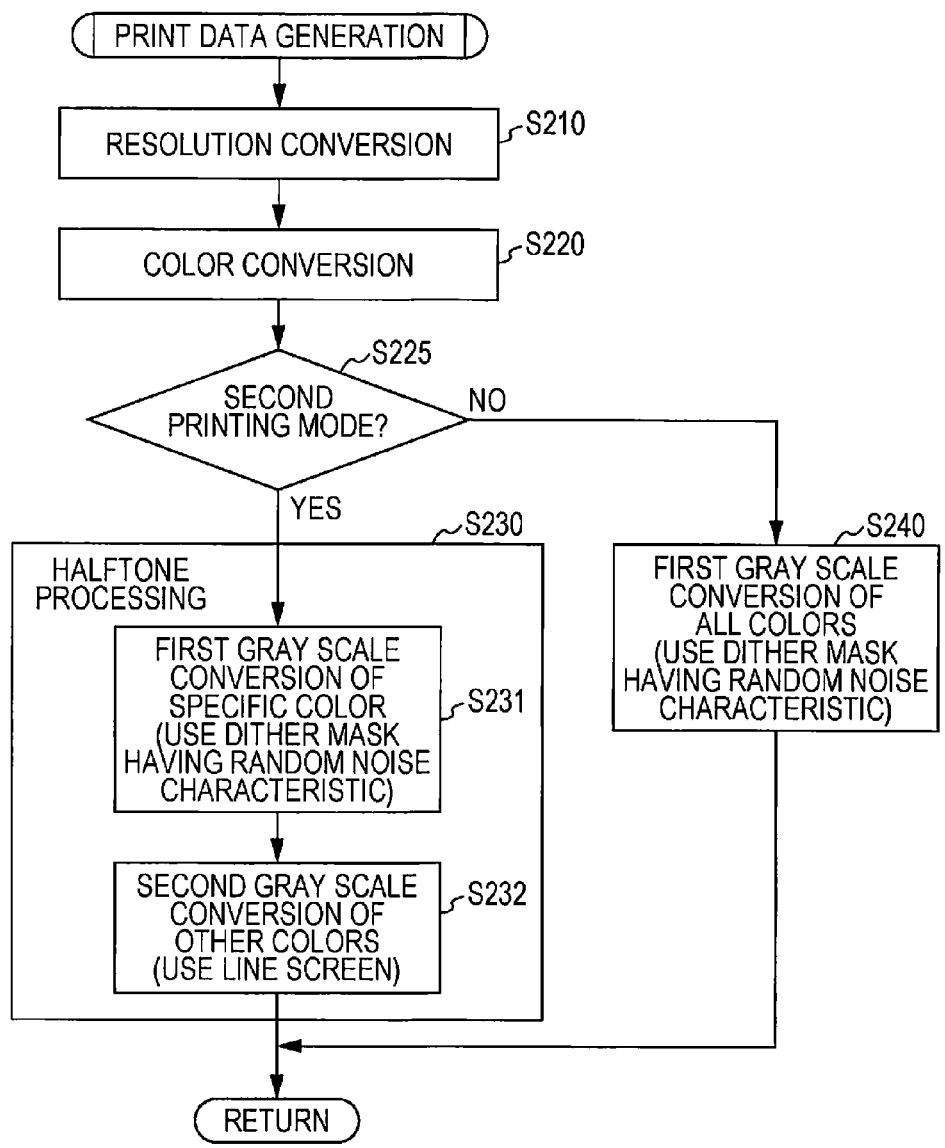
FIG. 7 is a flowchart showing a print data generation process according to a variation of the embodiment.

FIG. 7 is a flowchart showing the details of the print data generation process (step S200) according to a variation 3. FIG. 7 is different from FIG. 4 in further including steps S225 and S240. The control unit 11 (print data generation unit 12) decides whether the printing condition is currently set to the first printing mode or the second printing mode (step S225), and proceeds to step S230 when the second printing mode is selected, and to step S240 when the first printing mode is selected. To simplify the description, all the modes other than the second printing mode will be assumed to be the first printing mode. Thus, the control unit 11 selects one of step S230 and step S240 to perform the halftone processing, depending on the characteristic of the printing medium used for the printing.

At step S240, the control unit 11 generates the print data for the ink of all the colors (CMYK) used by the printing unit 30, through the first gray scale conversion. In other words, at step S240 the print data for the ink of all the colors is generated through the halftone processing using the dither mask having the random noise characteristic. When the printing medium resistant to ink blur, such as the glossy paper typically used for photo printing, is used, the shape of each single dot can be well maintained on the printing medium. Accordingly, it is presumed that performing the halftone processing using the line screen leads to printing an unnatural image because the regular alignments of the dots become prominently visible. In the variation 3, the arrangement as FIG. 7 is adopted in view of such a predicted drawback, by which degradation of print quality on the printing medium relatively resistant to ink blur can also be prevented, in addition to the advantageous effects thus far described.

Variation 4

The printing head 31 may be configured to dispense the ink droplets of a plurality of sizes through each of the nozzles 34. In other words, the ink droplets of at least two sizes may be dispensed. For example, the nozzles 34 may each be configured to dispense three types of ink droplets that are different in weight per droplet, namely a large dot, a medium dot, and a small dot. In this case, the control unit 11 generates, in the halftone processing (step S230, S240), quaternary data (print data) for setting one of large dot-on, medium dot-on, small dot-on, and dot-off with respect to each pixel and each ink color, instead of the binary data (print data) for setting one of dot-on and dot-off.

Variation 5

The printing unit 30 may be configured to act as a so-called serial printer. More specifically, the printing unit 30 may include a carriage 35 (see FIG. 1) driven by a motor so as to move in a predetermined main scanning direction, and the printing head 31 may be mounted on the carriage 35 so as to move together with the carriage 35 in the main scanning direction. Referring to FIG. 3, in this case the main scanning direction is parallel to the direction D2, and the transport direction of the printing medium is parallel to the direction D1. In addition, the horizontal printing resolution corresponds to the printing resolution in the main scanning direction, and the vertical printing resolution corresponds to the printing resolution in the transport direction. Thus, the control unit 11 may control the printing unit 30 so as to alternately repeat the ink dispensation (pass) from the printing head 31 performed while the carriage 35 is moving in the main scanning direction, and the transport of the printing medium (paper feed) in the transport direction, to thereby perform the printing.

This application claims priority under 35 U.S.C. §119 to Japanese Patent Application No. 2015-148941, filed Jul. 28, 2015. The entire disclosure of Japanese Patent Application No. 2015-148941 is hereby incorporated herein by reference.

What is claimed is:

1. A print control apparatus that generates print data for dispensing ink of a plurality of colors through respectively corresponding nozzles to thereby print an image on a printing medium, the print control apparatus comprising:
a controller that generates, according to the image, the print data defining on/off setting of dots in each of pixels with respect to the ink of each of the plurality of colors which include at least yellow and black,
the controller generating the print data for each of pixels with respect to all of the ink of yellow through first gray scale conversion using only a dither mask that has a blue noise characteristic such that the ink of yellow is irregularly positioned on the printing medium, and
the controller generating the print data for each of pixels with respect to all of the ink of black through second gray scale conversion using only a line screen.

2. The print control apparatus according to claim 1, wherein the controller generates the print data for the ink of a light shade through the first gray scale conversion, in addition to the ink of yellow.

3. The print control apparatus according to claim 1, wherein the controller further generates, through the first gray scale conversion, the print data for the ink of a color other than yellow and black.

4. The print control apparatus according to claim 1, wherein the controller uses the dither mask that has the blue noise characteristic with respect to only all of the ink of yellow while the controller uses the line screen with respect to all of the ink of colors that are different from yellow.

5. The print control apparatus according to claim 1, wherein the controller uses the dither mask that has the blue noise characteristic with respect to all of the ink of colors that are different from black while the controller uses the line screen with respect to only all of the ink of black.

6. A print control apparatus that generates print data for dispensing ink of a plurality of colors through respectively corresponding nozzles to thereby print an image on a printing medium based on one of a first printing mode in which a first printing medium is employed as the printing medium, and a second printing mode in which a second printing medium, more susceptible to ink blur than the first printing medium, is employed as the printing medium, the print control apparatus comprising:
a controller that generates, according to the image, the print data defining on/off setting of dots in each of pixels with respect to the ink of each of the plurality of colors,
the controller generating the print data for the ink of a specific color having highest brightness among the plurality of colors through first gray scale conversion using a dither mask, and generating the print data for the ink of the plurality of colors except for the color subjected to the first gray scale conversion, through second gray scale conversion using a line screen,
the controller generating
the print data for the ink of the specific color through the first gray scale conversion while generating the print data for the ink of the colors not subjected to the first gray scale conversion through the second gray scale conversion when the second printing mode is selected, and
the print data for the ink of all of the plurality of colors through the first gray scale conversion when the first printing mode is selected.

7. A print control method including generating print data for dispensing ink of a plurality of colors through respectively corresponding nozzles to thereby print an image on a printing medium, the print control method comprising:
generating, according to the image, the print data defining on/off setting of dots in each of pixels with respect to the ink of each of the plurality of colors which include at least yellow and black,
the generating of print data includes:
generating the print data for each of pixels with respect to all of the ink of yellow through first gray scale conversion using only a dither mask that has a blue noise characteristic such that the ink of yellow is irregularly positioned on the printing medium; and
generating the print data for each of pixels with respect to all of the ink of black through second gray scale conversion using only a line screen.

* * * * *